(12) United States Patent
Mainiero

(10) Patent No.: US 11,280,234 B2
(45) Date of Patent: Mar. 22, 2022

(54) COMBUSTION ENGINE CRANKCASE BREATHER SYSTEM AND METHOD

(71) Applicant: Joe Mainiero, Lake Worth, FL (US)

(72) Inventor: Joe Mainiero, Lake Worth, FL (US)

(*) Notice: Subject to any disclaimer, the term of this patent is extended or adjusted under 35 U.S.C. 154(b) by 167 days.

(21) Appl. No.: 16/864,225

(22) Filed: May 1, 2020

(65) Prior Publication Data
US 2020/0256226 A1 Aug. 13, 2020

Related U.S. Application Data

(63) Continuation-in-part of application No. 16/532,602, filed on Aug. 6, 2019, now Pat. No. 10,677,121, which is a continuation of application No. 16/280,979, filed on Feb. 20, 2019, now Pat. No. 10,408,100, which is a continuation-in-part of application No. 15/496,058, filed on Apr. 25, 2017, now Pat. No. 10,233,802.

(51) Int. Cl.
| | |
|---|---|
| *F01M 13/04* | (2006.01) |
| *F01M 13/00* | (2006.01) |
| *B01D 46/44* | (2006.01) |
| *B01D 46/00* | (2022.01) |

(52) U.S. Cl.
CPC ........ *F01M 13/04* (2013.01); *F01M 13/0011* (2013.01); *B01D 46/0002* (2013.01); *B01D 46/444* (2013.01); *B01D 2279/60* (2013.01); *F01M 2013/0044* (2013.01); *F01M 2013/0438* (2013.01); *F01M 2013/0488* (2013.01)

(58) Field of Classification Search
CPC ............... F01M 13/04; F01M 13/0011; F01M 2013/0044; F01M 2013/0438; F01M 2013/0488; B01D 46/0002; B01D 46/444; B01D 2279/60; B01D 46/003; B01D 46/106
See application file for complete search history.

(56) References Cited

U.S. PATENT DOCUMENTS

| | | | | |
|---|---|---|---|---|
| 3,255,743 | A * | 6/1966 | Kolbe | F01M 13/00 |
| | | | | 123/574 |
| 4,011,846 | A * | 3/1977 | Gagliardi | F02M 25/06 |
| | | | | 123/568.15 |
| 4,947,806 | A * | 8/1990 | Speer | F01M 13/00 |
| | | | | 123/198 C |
| 6,092,492 | A * | 7/2000 | Kampichler | F01M 13/04 |
| | | | | 123/41.86 |

(Continued)

FOREIGN PATENT DOCUMENTS

| | | | | |
|---|---|---|---|---|
| GB | 1255642 A | * | 12/1971 | ............. F01M 13/04 |
| JP | 03242411 A | * | 10/1991 | ........... F01M 13/025 |

*Primary Examiner* — Hung Q Nguyen
(74) *Attorney, Agent, or Firm* — Uradnik Law Firm PC

(57) ABSTRACT

In a combustion engine, an exit stream of blow-by gases follows a fluid pathway through an oil and air separator and a breather filter, the oil and air separator including a first housing including a central chamber therein, the central chamber divided into a first outer portion and a second inner portion by a barrier; a filter material disposed between the first outer portion and the second inner portion; a cap directly coupled to the first housing, the cap including a first lumen therethrough, the first lumen including a first end disposed at the second inner portion; and a coupler removably coupling the cap and an extension portion including a second lumen therethrough.

11 Claims, 13 Drawing Sheets

(56) References Cited

U.S. PATENT DOCUMENTS

| | | | | |
|---|---|---|---|---|
| 6,123,061 | A * | 9/2000 | Baker | F01M 13/021 |
| | | | | 123/573 |
| 6,167,849 | B1 * | 1/2001 | Wilson | F02M 25/06 |
| | | | | 123/41.86 |
| 9,732,707 | B1 * | 8/2017 | Urban | F01M 13/023 |
| 10,184,368 | B2 * | 1/2019 | Takada | F01M 13/04 |

* cited by examiner

COMBUSTION ENGINE CRANKCASE BREATHER SYSTEM AND METHOD

RELATED APPLICATIONS

This application is a continuation-in-part of, and relates and claims priority to, U.S. patent application Ser. No. 16/532,602, filed on Aug. 6, 2019, now U.S. Pat. No. 10,677,121 issued on Jun. 9, 2020; which is a continuation of, and relates and claims priority to, U.S. patent application Ser. No. 16/280,979, filed on Feb. 20, 2019, now U.S. Pat. No. 10,408,100 issued on Sep. 10, 2019; which is a continuation-in-part of, and relates and claims priority to, U.S. patent application Ser. No. 15/496,058, filed on Apr. 25, 2017, now U.S. Pat. No. 10,233,802 issued on Mar. 19, 2019.

FIELD OF THE DISCLOSURE

The invention relates generally to the removal of crankcase oil from one or more exit airstreams from a crankcase of an internal combustion engine, and more particularly to the use of an oil and air separator downstream from an engine oil fill port and/or upstream from the intake manifold in a recycling system including a positive crankcase ventilation (PCV) valve, and more specifically to a combustion engine crankcase breather system including an oil and air separator.

BACKGROUND

In a combustion engine, blow-by gases typically include unburned gasoline. That is, an amount of air and unburned gasoline from the engine cylinder is pulled past the piston rings and into the crankcase.

In one instance, blow-by gases might be exhausted to the atmosphere through a breather system coupled directly to an engine oil fill port. See FIG. 1. In another instance, instead of exhausting blow-by gases to the atmosphere, a positive crankcase ventilation (PCV) system recycles the blow-by gases through a PCV valve into the engine's intake manifold. Such recycling occurs when the engine is operating at relatively slow speeds (e.g. idling), i.e., when the air pressure in the crankcase is higher than the air pressure in the intake manifold.

One problem associated with breather systems and PCV systems and their use involves oil vapors. An engine's crankcase is used to store oil. A pan located below the crankshaft holds oil, and generally oil vapors from the oil in the pan may find their way into the blow-by gases.

In a combustion engine, crankcase breathers have been used as a replacement for an engine oil fill cap. See FIG. 1. A crankcase breather 10 creates a fluid pathway for engine combustion gases to travel through the engine oil fill port 20 and through the crankcase breather 10 to the atmosphere. The crankcase breather 10 may include a means 30 for filtering oil from the combustion gases. However, a problem exists in that the top filter means 30 allows oil to blow all over in the engine bay, creating a huge mess. Control of the oil from the exhaust gases is unmanageable. There is no way to prevent the escape of oil to the environment, and no way to prevent oil undesirable oil dripping (e.g., onto driveways, garage floors).

It is also undesirable for oil to be recycled with blow-by gases into an engine's intake manifold. Such recycled oil may degrade engine performance by lowering the overall octane of the combustion mixture in a cylinder. Such recycled oil also may coat the air intake and prevent airflow. To help combat the presence of oil in blow-by gases, "dirty-side" oil and air separators were developed to remove the oil from the blow-by gases before recirculation through the PCV valve and into the intake manifold. However, when the air pressure in the crankcase is higher than the air pressure in the intake manifold, it is also possible that blow-by gases will travel upstream (or backwards) into the "clean-side" assembly that leads from the PCV valve to the intake manifold.

There are various different models or types of oil and air separators available. One popular type of oil and air separator involves passing oily blow-by gases through a filter material. The oil collects in droplets on the filter material, which may be held in place by a screen. The oil is allowed to drop into the bottom of a can where the oil collects for later removal. This "can approach" to oil and air separation is not without its drawbacks, however.

SUMMARY

The present disclosure provides oil and air separation systems and methods. In one exemplary embodiment, an oil and air separator includes: (a) a first housing including a central chamber therein, the central chamber divided into a first outer portion and a second inner portion by a barrier; (b) a filter material disposed between the first outer portion and the second inner portion; (c) a cap directly coupled to the first housing, the cap including a first lumen therethrough, the first lumen including a first end disposed at the second inner portion; (d) an extension portion including a second lumen therethrough; and (e) a coupler removably coupling the cap and the extension portion. In alternate embodiments, the oil and air separator may be provided in combination with one or more of: (a) a sensor such as an air flow sensor, (b) a PCV valve, (c) a one-way check valve, and (d) a breather system.

Other benefits and advantages of the present disclosure will be appreciated from the following detailed description.

DETAILED DESCRIPTION

Figure 1:
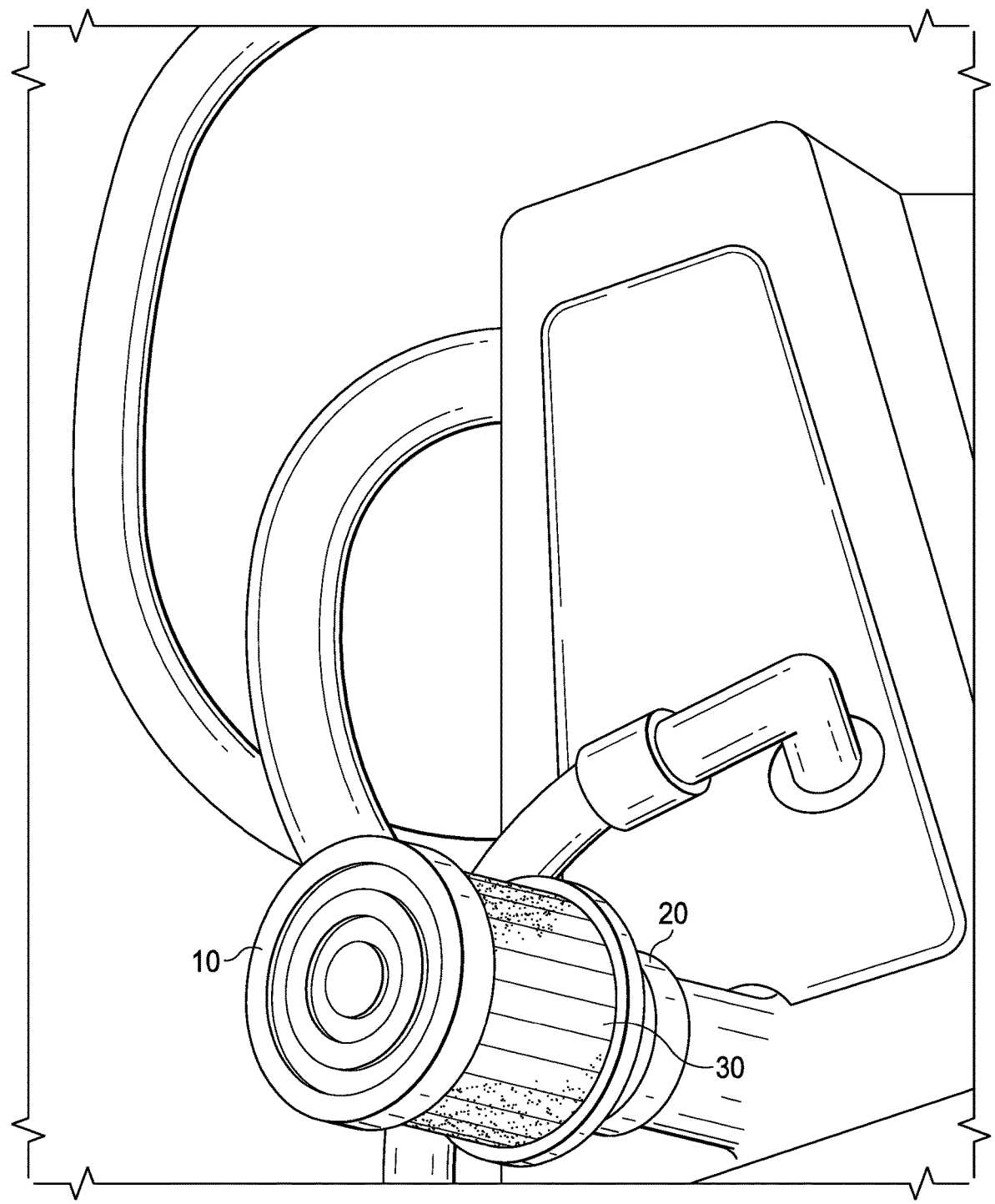
FIG. 1 is a perspective view of an exemplary prior art breather system for combustion engine crankcase gases.

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to oil and air separation; etc. Such aspects related to this disclosure do not depart from the invention, and it is therefore intended that the invention not be limited by the certain aspects set forth of the events and circumstances related to this disclosure.

The present disclosure in one embodiment provides an oil and air separator in fluid communication with an exit airstream from a combustion engine crankcase. The oil and air separator may be used in a first embodiment in an airstream for venting blow-by gases to the atmosphere. The oil and air separator in a second embodiment may be used in an airstream that is recycled into a combustion engine's intake manifold.

In accordance with the first embodiment involving venting blow-by gases to the atmosphere, the present disclosure provides an improved breather system for a combustion engine crankcase. More particularly, in one exemplary embodiment, a system includes a one-way valve coupled to a connector adapted with threads to serve as a replacement for an engine oil fill cap. A fluid communication pathway is provided from the engine crankcase through the connector and valve to the inlet of an oil and air separator system. The oil and air separator system includes a can including internal means for separating oil from the airstream following the fluid pathway from the engine crankcase. The internal means may include a barrier between a first chamber and a second chamber within the can. The barrier may include a filter material for separating oil from air, for example stainless steel wool or other coalescing mesh material. At the exit port of the oil and air separator system a breather may be provided that includes a second filter material through which engine crankcase gases may be vented to the atmosphere.

FIG. 1 shows an exemplary prior art breather system for combustion engine crankcase gases. The crankcase breather 10 creates a fluid pathway for engine combustion gases to travel through the engine oil fill port 20 and through the crankcase breather 10 to the atmosphere. The crankcase breather 10 may include a means 30 for filtering oil from the combustion gases.

Figure 2:
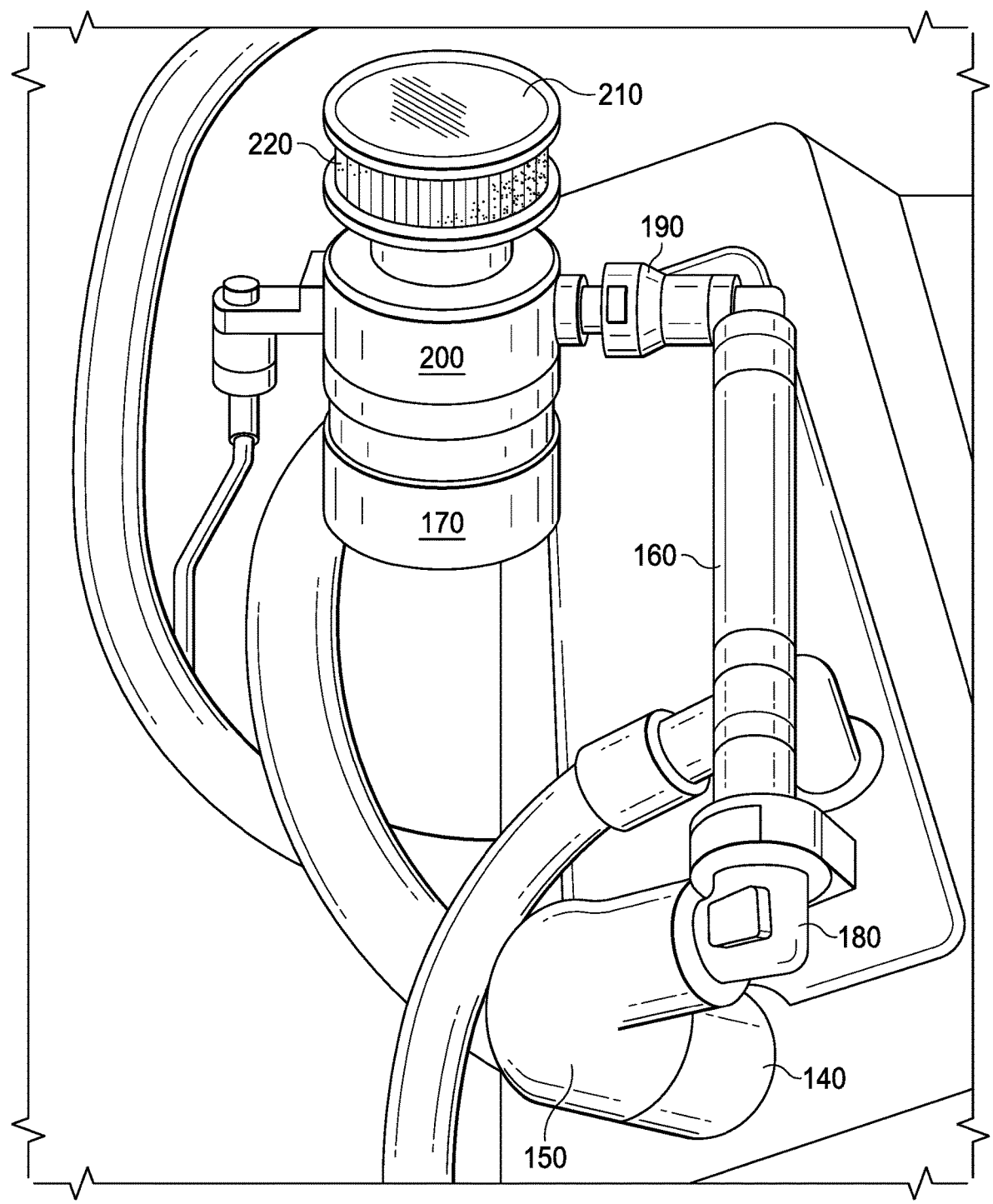
FIG. 2 is a perspective view of an exemplary embodiment of an improved breather system for combustion engine crankcase gases.
Figure 3:
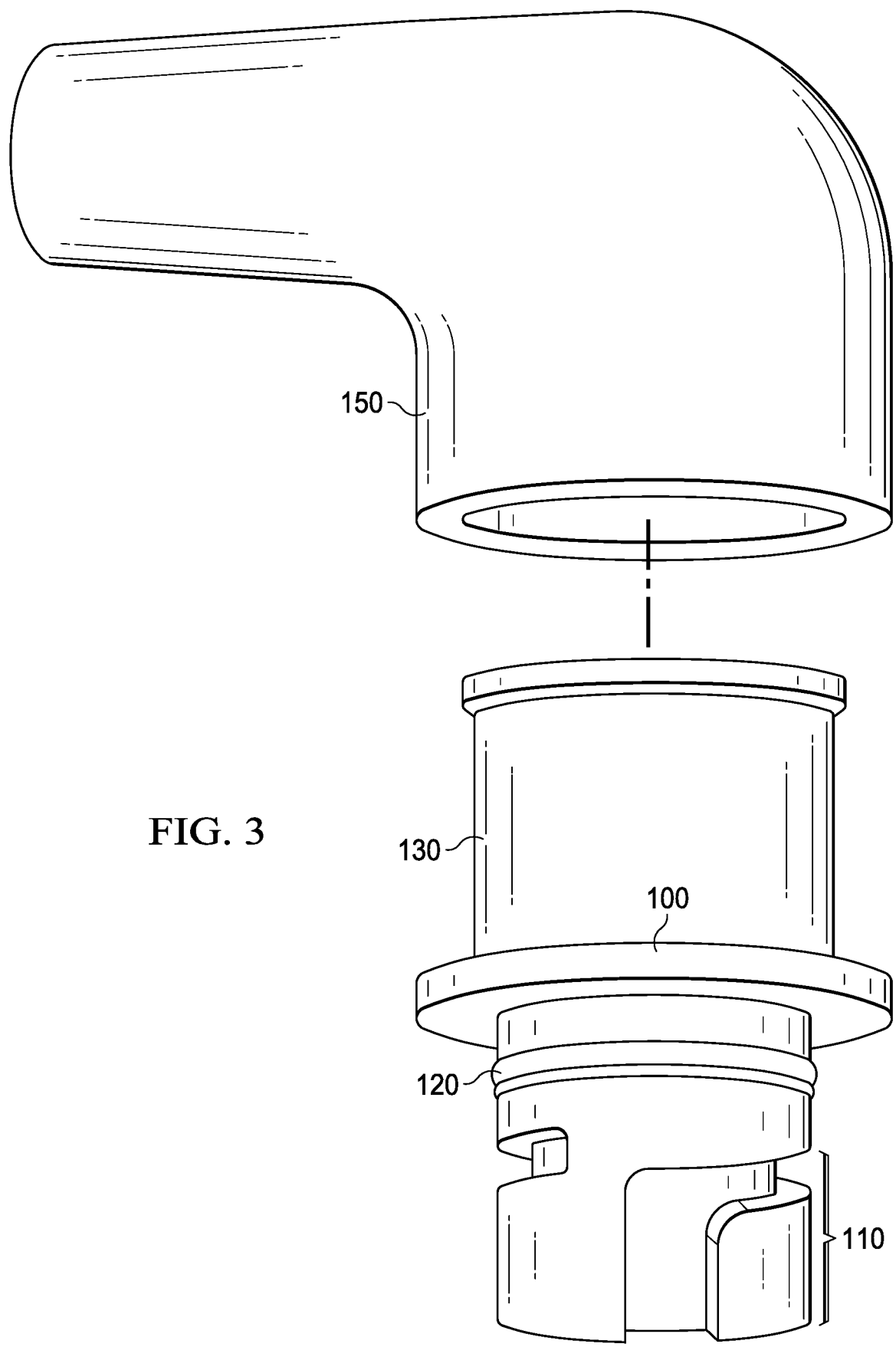
FIG. 3 is a perspective view of a one-way valve and connector for an engine oil fill port for use in the exemplary embodiment of an improved breather system for combustion engine crankcase gases shown in FIG. 2.

An improved breather system for combustion engine crankcase gases in accordance with the present disclosure is shown by way of example in FIGS. 2 and 3. A connector 100 may be provided that includes a threaded portion 110 and an o-ring 120. The connector 100 serves as a replacement for an engine oil fill cap. Coupled to the connector 100 may be a one-way valve 130.

As shown in FIG. 2, the connector 100 and one-way valve 130 form an exit port 140 for combustion engine crankcase gases. The exit port 140 may be fluidly coupled via tubing 150, 160 to an oil and air separator 170. A first quick release coupling 180 may be provided proximate the exit port 140, and a second quick release coupling 190 may be provided proximate oil and air separator 170.

The oil and air separator 170 may include a can 200 including internal means for separating oil from the airstream following the fluid pathway from the engine crankcase. The internal means may include a barrier between a first chamber and a second chamber within the can. The barrier may include a filter material for separating oil from air, for example stainless steel wool or other coalescing mesh material. At the exit port of the oil and air separator 170 a breather 210 may be provided that includes a second filter material 220 through which engine crankcase gases may be vented to the atmosphere.

In this way, a system for managing oil entrained in a crankcase exhaust flow is provided. Oil may be separated from the exhaust airstream and collected in the can of the oil and air separator, preventing undesirable oil dispersal about the engine bay and onto surfaces such as driveways and garage floors.

Figure 4:
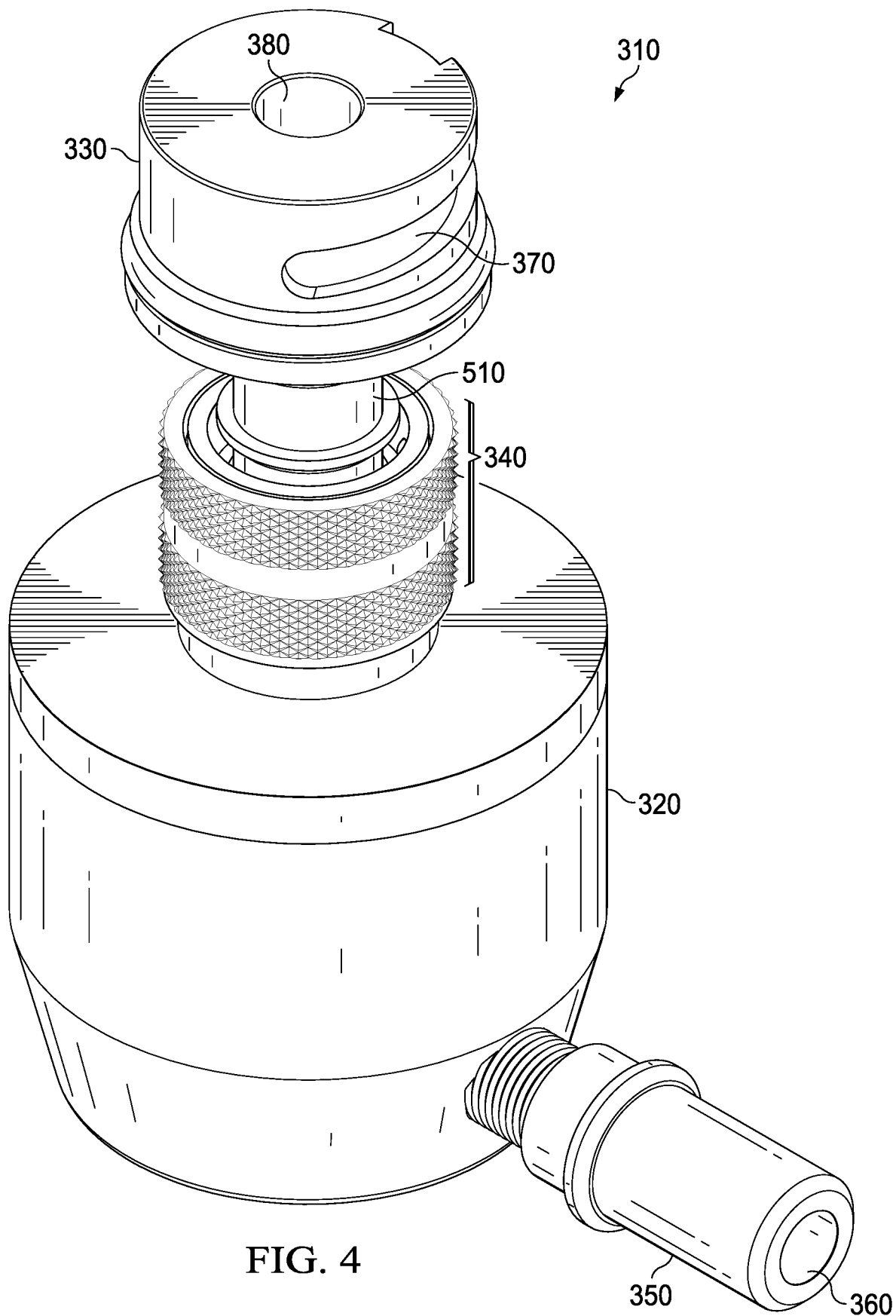
FIG. 4 is a perspective view of an exemplary embodiment of a clean-side oil and air separator.

In accordance with the second embodiment involving recycling blow-by gases, the recycled gases may be provided, for example, to an intake manifold port or to an engine oil fill port. By way of example, as shown in FIG. 4, an exemplary embodiment of a clean-side oil and air separator 310 including a first housing 320, a second housing 330, and a coupler 340 removably connecting the first housing 320 and the second housing 330. The first housing 320 includes an air intake 350 including an air intake port 360. The air intake port 360 receives recycled blow-by gases that have passed through a PCV valve. The second housing 330 includes a threaded portion 370 that enables the second housing 330 to serve as a direct replacement for a removable engine oil fill cap. An o-ring 375 may be positioned about the second housing 330 to help reduce the outward passage of fluids at the engine oil fill port. The second housing 330 also includes an opening 380 that is in direct fluid communication with an engine's intake manifold when the second housing 330 is removably installed at the engine's engine oil fill port. A continuous fluid pathway is disposed within the first housing 320, the second housing 330, and the coupler 340 that extends between the air intake port 360 and the opening 380.

In an alternate embodiment, a replacement for an engine oil fill cap (i.e., second housing 330) need not be coupled to first housing 320. Instead, a continuous fluid pathway may be formed between the air intake port 360 and an engine's air intake manifold, not utilizing the the engine oil fill port for the recycling of blow-by gases. In such an instance, the engine oil fill port may be coupled to a breather system as described above.

Figure 5:
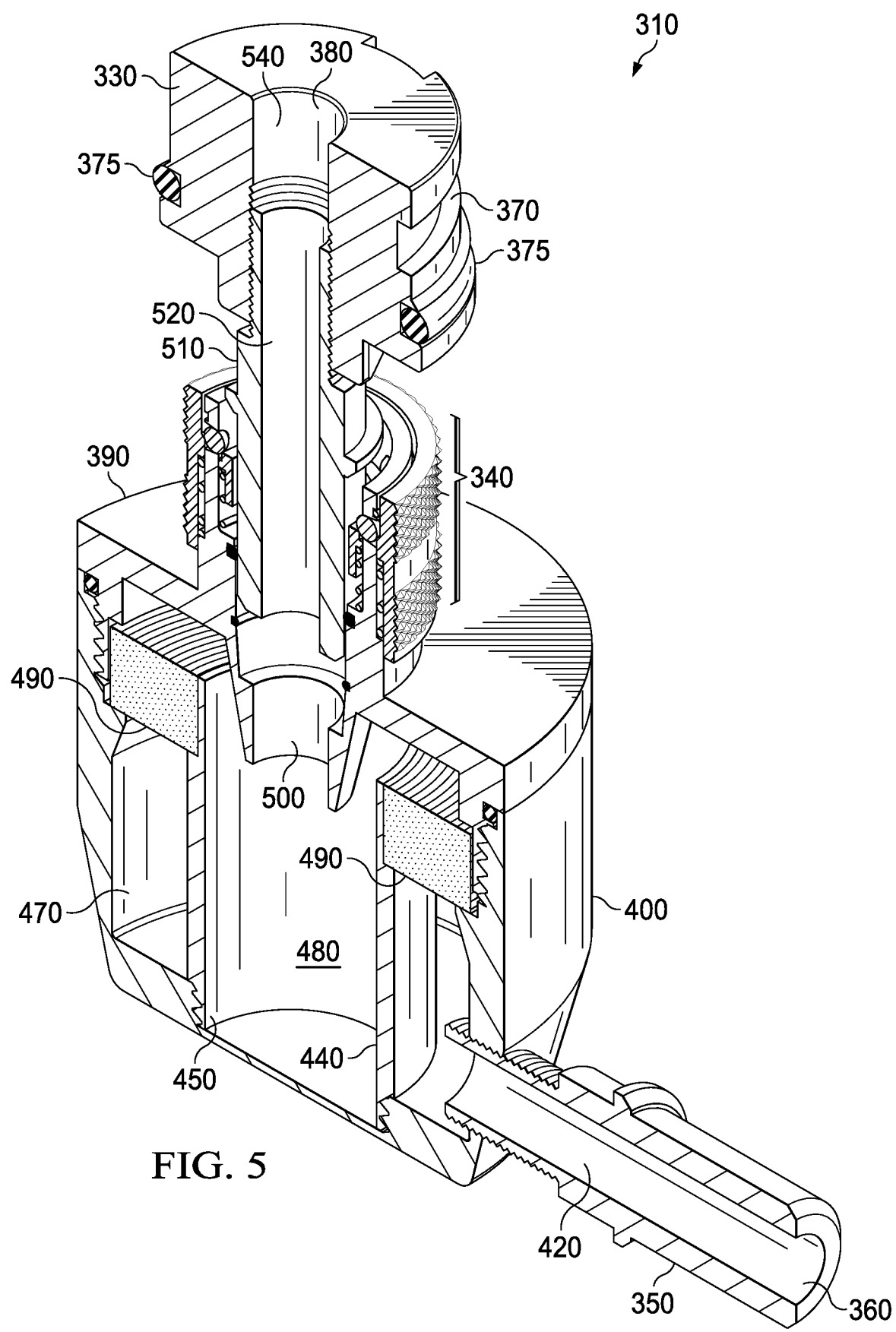
FIG. 5 is a sectional view of the exemplary embodiment of a clean-side oil and air separator shown in FIG. 4.
Figure 6:
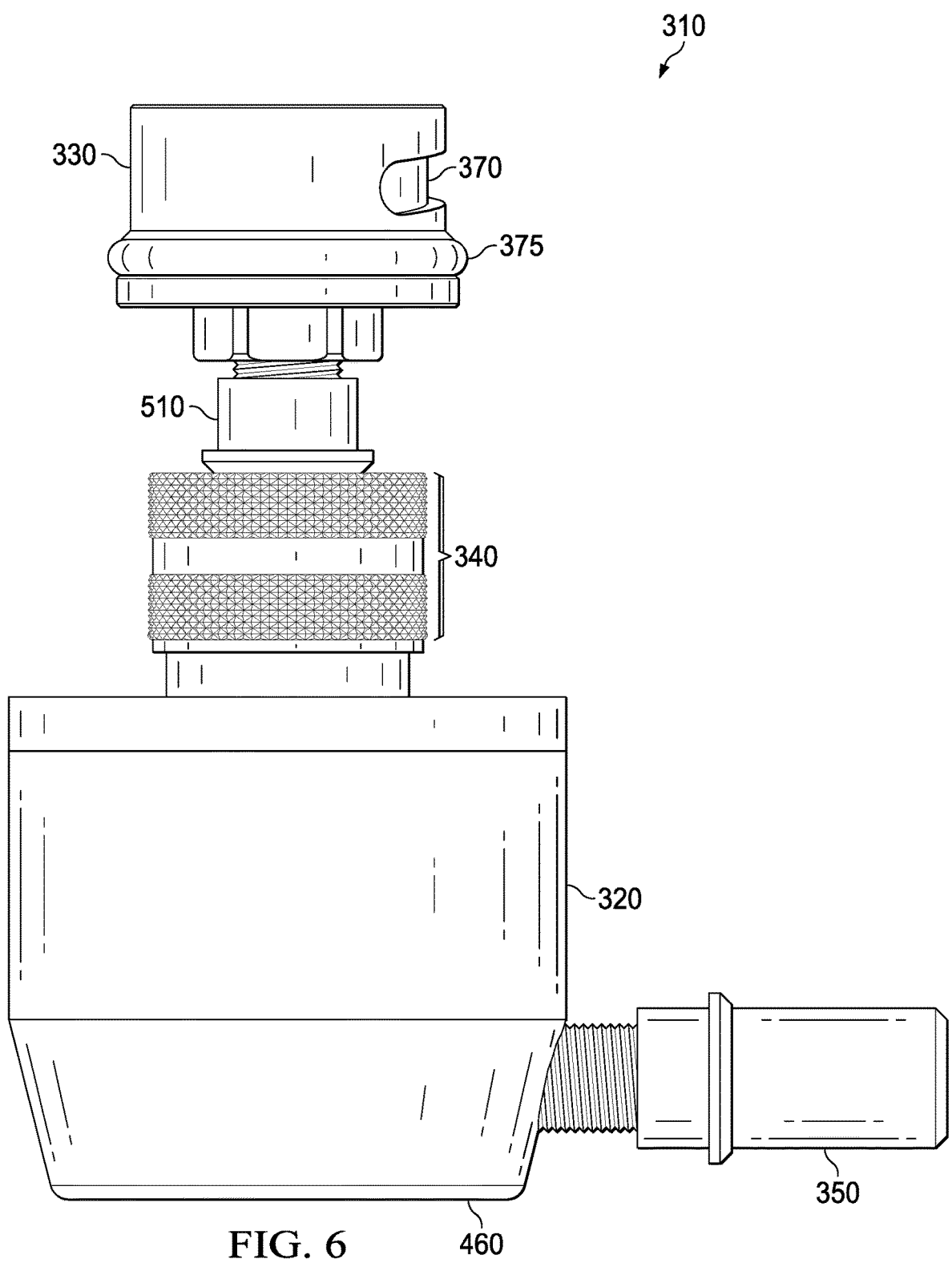
FIG. 6 is a side view of the exemplary embodiment of a clean-side oil and air separator shown in FIG. 4.
Figure 7:
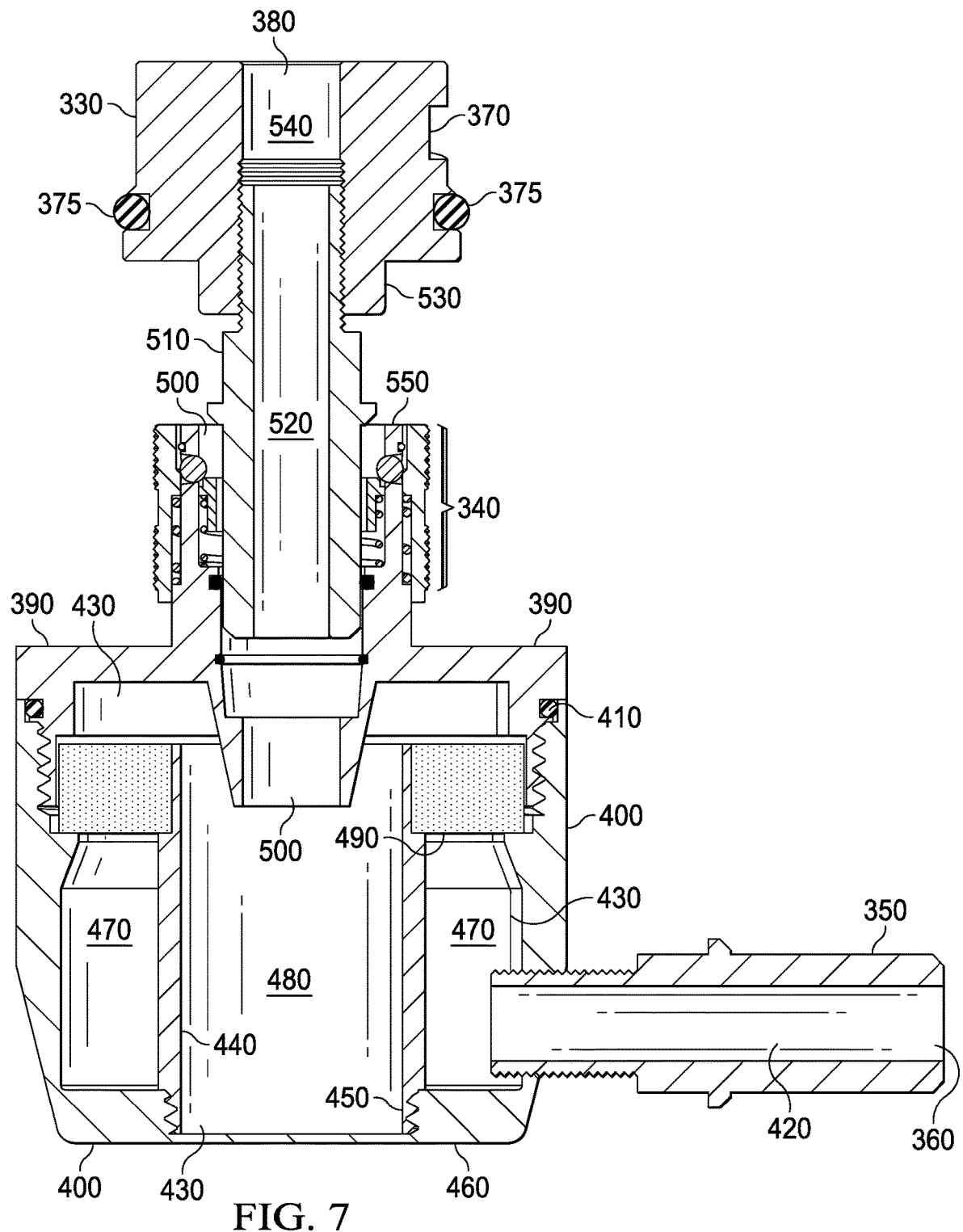
FIG. 7 is a cross-sectional view of the exemplary embodiment of a clean-side oil and air separator shown in FIG. 4.
Figure 8:
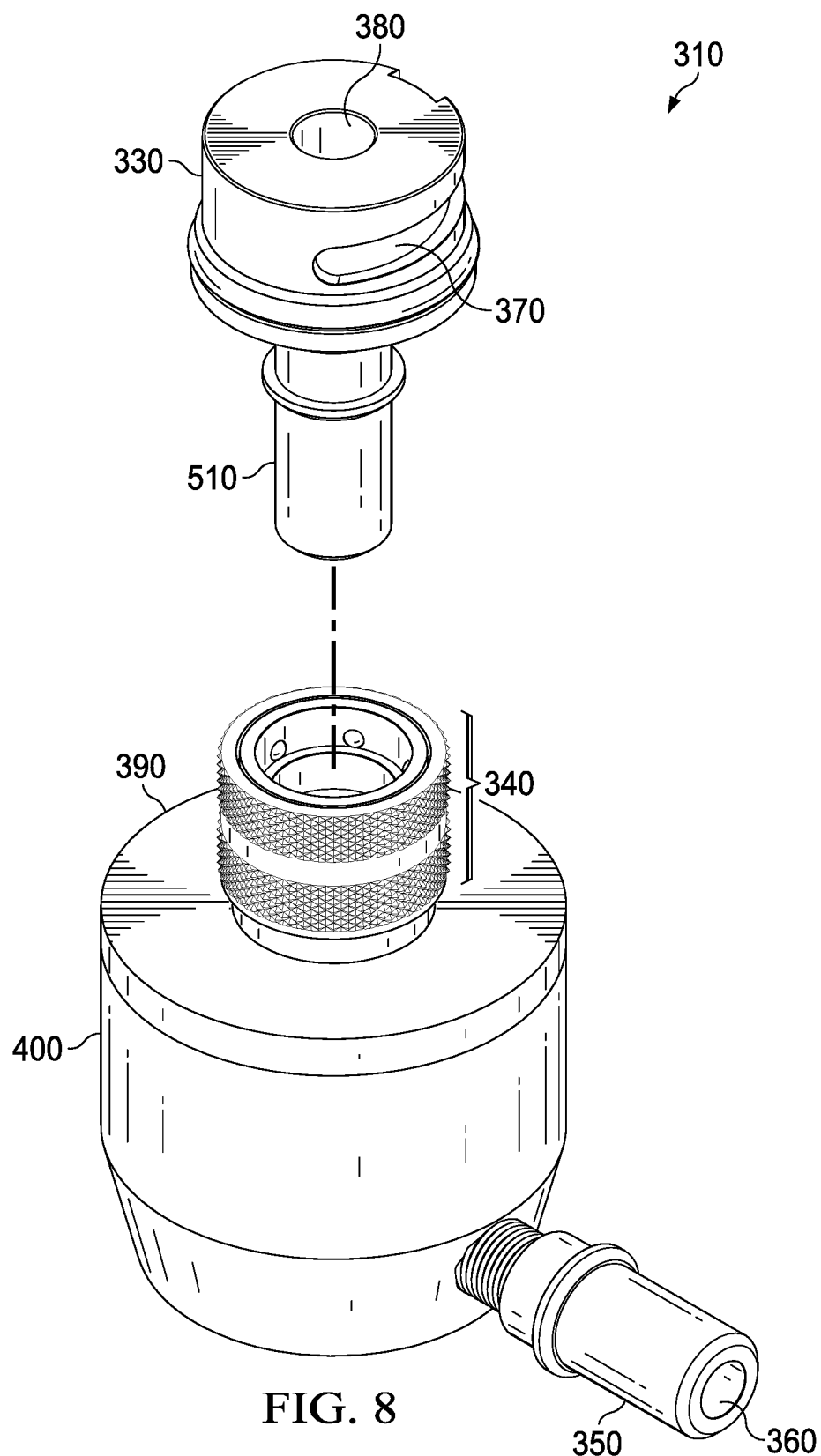
FIG. 8 is an assembly view illustrating, among other things, the removably coupling of the first housing and the second housing of the exemplary embodiment of a clean-side oil and air separator shown in FIG. 4.

As shown in FIGS. 5-7, the first housing 320 includes a cap 390 threadingly engaged with main body portion 400. An o-ring 410 may be positioned between the cap 390 and the main body portion 400 to help prevent the passage of fluids therebetween. The air intake 350 is threadingly engaged with the main body portion 400, so that a continuous fluid pathway exists from air intake port 360, through lumen 420 included within air intake 350, to a central chamber 430 disposed within first housing 320. A tubularly-shaped barrier or wall 440 is disposed within central chamber 430. A first end 450 of wall 440 is threadingly engaged to one end 460 of first housing 320. The wall 440 in effect divides the central chamber 430 into a first outer portion 470 and a second inner portion 480. A filter 490 separates outer portion 470 and inner portion 480, so that all fluid flow between outer portion 470 and inner portion 480 must pass through the filter 490. In one embodiment, the filter 490 includes a coalescing filter. In another embodiment, the filter 490 includes a screen. In another embodiment, the filter 490 includes stainless steel wool.

The cap 390 includes a lumen 500 therethrough. At one end, the lumen 500 is in fluid communication with the central chamber 430 at inner portion 480. At the opposite end, the lumen 500 is adapted to receive a portion of an extension 510 of second housing 330. The extension 510 may be a generally tubularly-shaped member including a lumen 520 therethrough. The extension 510 may be threadingly engaged with the main body portion 530 of second housing 330 at lumen 540 therethrough. Thus, a continuous fluid pathway is formed between opening 380 and port 360 through lumen 540, lumen 520, lumen 500, chamber portion 480, filter 490, chamber portion 470, and lumen 420.

Figure 9:
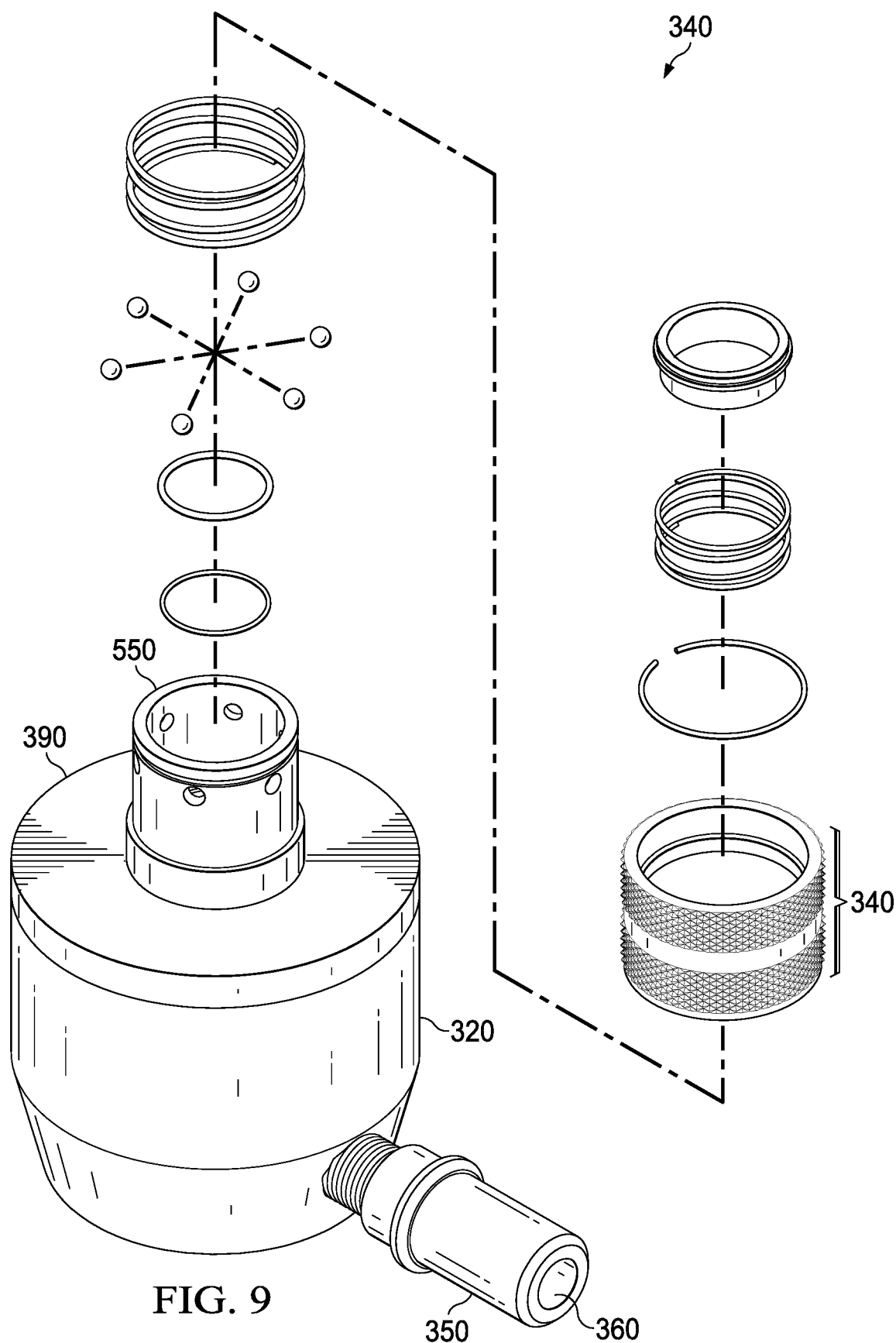
FIG. 9 is an assembly view of the coupler of the exemplary embodiment of a clean-side oil and air separator shown in FIG. 4.
Figure 10:
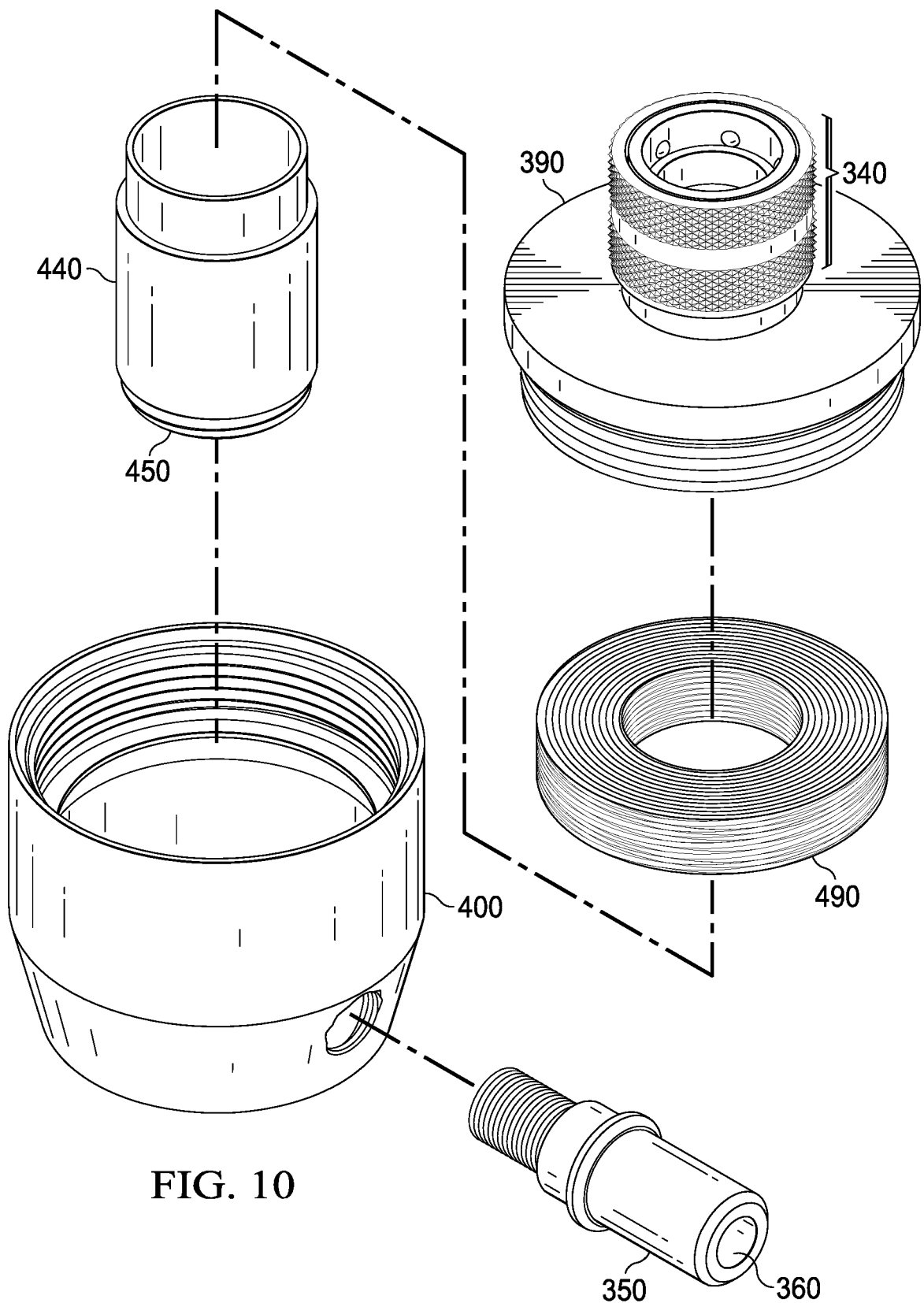
FIG. 10 is an assembly view of the first housing of the exemplary embodiment of a clean-side oil and air separator shown in FIG. 4.

End 550 of cap 390 may be adapted to form, or join with, the coupler 340. The coupler 340 includes an assembly of parts that permits a portion of extension 510 to be releasably received within lumen 500 of cap 390 at end 550. See FIG. 9. AMT or other style couplers may be used.

In accordance with the description herein, a method of oil and air separation may include providing an oil and air separator including a coalescing filter material disposed within a fluid pathway through the separator. The separator may include a first housing including the filter material, a second housing adapted for connecting to an engine oil fill port, and a coupler removably coupling or joining the first housing and the second housing.

Figure 11:
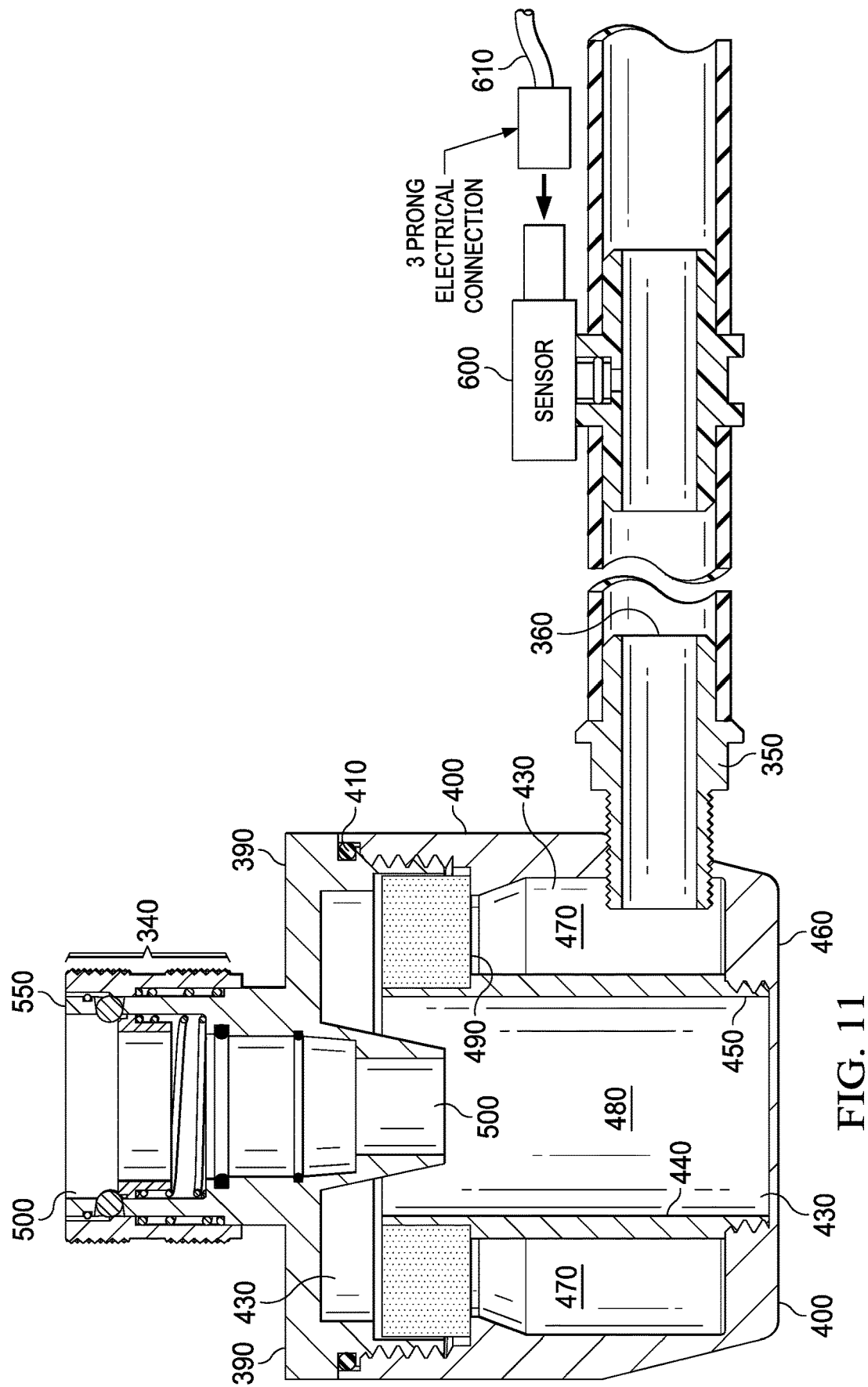
FIG. 11 is a cross-sectional view of an exemplary embodiment of an oil and air separator including an air flow sensor.

As shown in FIG. 11, an alternate embodiment of an oil and air separator including a sensor 600 may be provided. The sensor may be positioned proximate the air intake port 360 of first housing 320. A continuous fluid pathway may extend from the sensor 600 to the air intake port 360 and beyond. The sensor may be provided to measure one or more operating characteristics of the PCV system. In an alternate embodiment, multiple sensors may be provided for the fluid pathway to monitor one or more operating characteristics. The sensor shown in FIG. 11 measures the air flow in the PCV system. The sensor is a variable voltage sensor in that a voltage varies as the air flow in the fluid pathway increases or decreases. When an undesirable air flow is detected, the sensor may indicate a signal via line 610 that is processed to turn on a vehicle's "check engine" light.

Figure 12A:
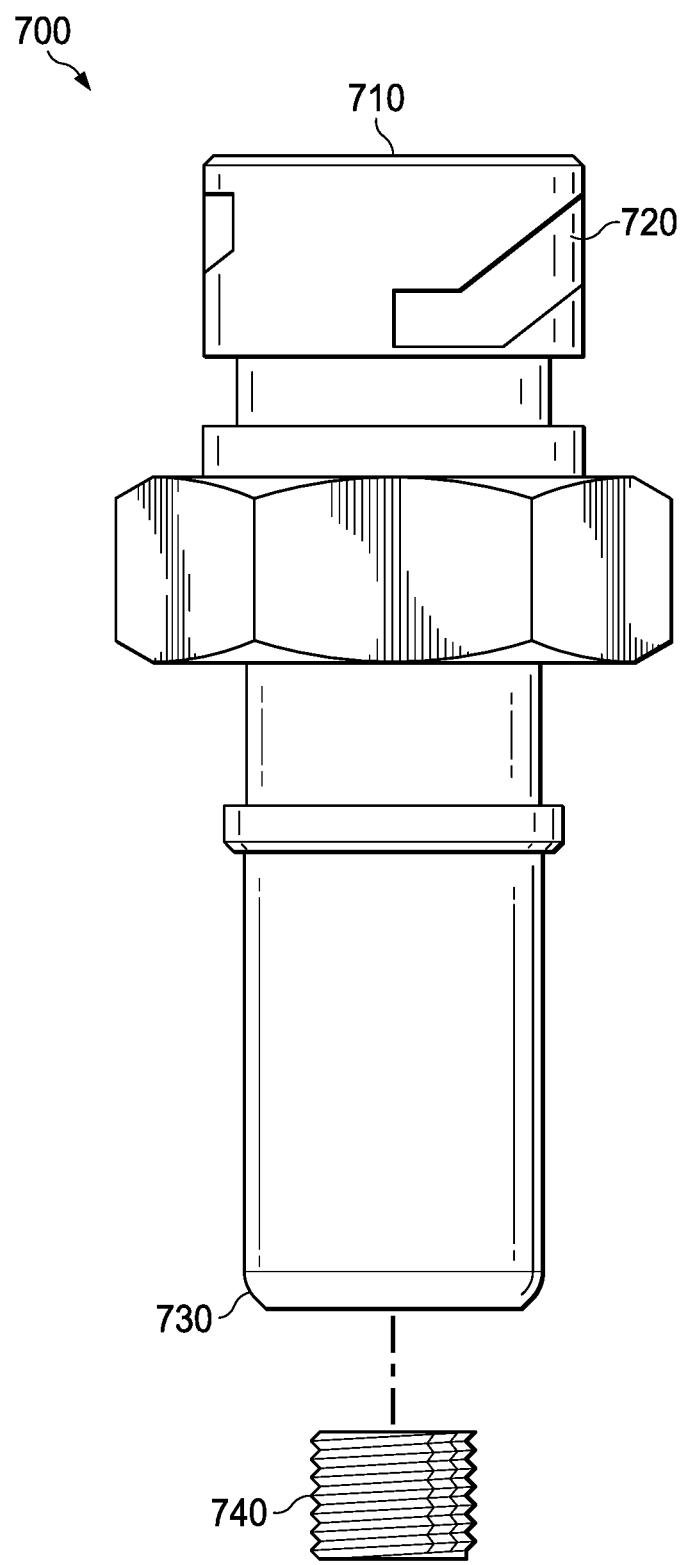
FIG. 12A is a side view in partially exploded form of an exemplary embodiment of a PCV valve.
Figure 12B:
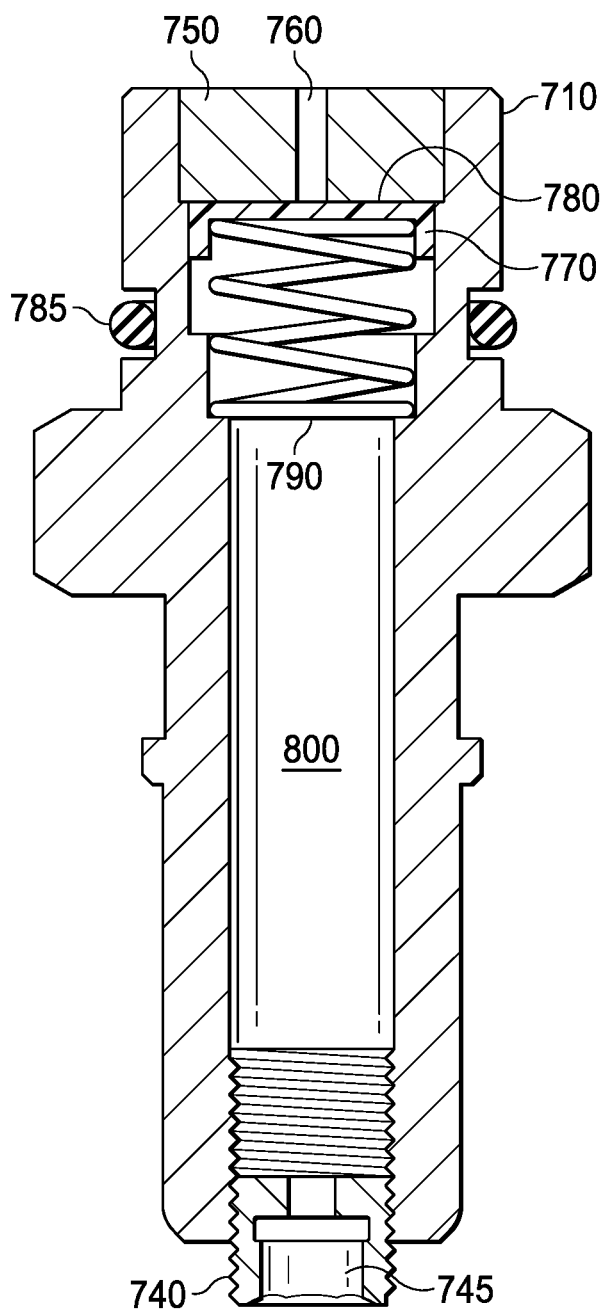
FIG. 12B is a cross-sectional view of the PCV valve shown in FIG. 12A.
Figure 12C:
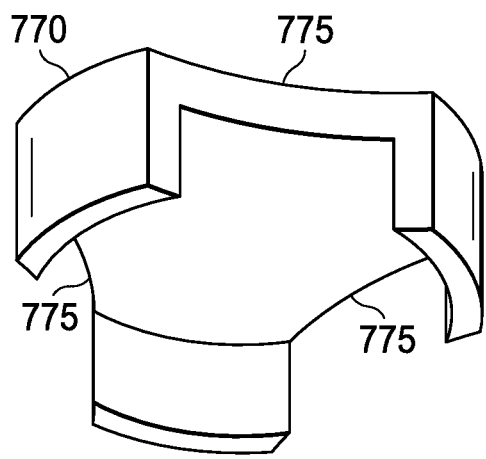
FIG. 12C is a perspective view of the cap component of the PCV valve shown in FIGS. 12A and 12B.

In accordance with the present description, a PCV valve 700 is shown in FIGS. 12A, 12B and 12C. The PCV valve 700 may include a first end 710 adapted with a threaded portion 720 for connection to an intake manifold port. An o-ring 785 may be used to seal the connection. The second end 730 of PCV valve 700 may include a threaded portion for receiving a port 740. The port 740 includes a lumen 745 therethrough which is in fluid communication with a lumen 800 through the PCV valve 700. The port 740 in one embodiment may be an insert with male threads. In another embodiment, the port 740 may be a cap-like structure with female threads. In one embodiment, the size of the lumen through port 740 may be adjusted by removing a first port 740 with a predetermined lumen size and replacing the first port 740 with a second port having a larger or smaller lumen than first port 740. Accordingly, in one embodiment the PCV valve 700 may comprise a kit including one or more ports that may be received at end 730 of PCV valve 700. By a user selecting a desired size port component, more precise control of the airflow through PCV valve 700 may be achieved.

As shown in FIG. 12B, the first end 710 includes an insert 750 with a lumen 760 therethrough. A cap 770 may be urged by spring 790 against bottom surface 780 of insert 750, so that the cap 770 may close the lumen 760. However, when a sufficient pressure differential exists across cap 770, the spring 790 may be compressed so that a continuous open fluid pathway extends from lumen 760 past cap 770 via cut-outs 775 to the lumen 800 of the main body portion of PCV valve 700.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. A breather system for a combustion engine crankcase including an engine oil fill port comprising, in series:
   (a) a connector including a threaded portion, the connector serving as a replacement for an engine oil fill port cap;
   (b) a one-way valve fluidly coupled to the connector;
   (c) an oil and air separator fluidly coupled to the connector via the one-way valve; and
   (d) a breather filter fluidly coupled to an exit port of the oil and air separator,
   wherein combustion engine crankcase gases may flow from the crankcase through the connector, valve, separator, and breather filter to the atmosphere; and wherein the oil and air separator removes a portion of oil entrained in the combustion engine crankcase gases exiting the combustion engine crankcase.

2. The breather system of claim 1, wherein the oil and air separator includes:
   a can including a first chamber fluidly coupled to the separator inlet and a second chamber fluidly coupled to the separator exit port; and
   a barrier separating the first chamber and the second chamber.

3. The breather system of claim 2, wherein the barrier includes a coalescing filter material.

4. The breather system of claim 3, wherein the coalescing filter material includes steel wool.

5. A method of removing oil from combustion engine crankcase gases comprising:
   providing a one-way valve in series with an oil and air separator between a source of engine crankcase gases and a breather filter to form a continuous fluid pathway from the crankcase through the one-way valve, through the oil and air separator, and through the breather filter to the atmosphere; wherein the oil and air separator is effective to remove a portion of oil entrained in the gases traveling through the continuous fluid pathway; and wherein the source of engine crankcase gases is an engine oil fill port.

6. The method of claim 5, wherein the oil and air separator includes a coalescing filter material.

7. The method of claim 6, wherein the coalescing filter material includes steel wool.

8. A breather system for a combustion engine crankcase comprising:
   (a) a connector including a threaded portion removably coupled to a source of combustion engine crankcase gases;
   (b) a one-way valve fluidly coupled to the connector;
   (c) an oil and air separator fluidly coupled to the connector via the one-way valve; and
   (d) a breather filter fluidly coupled to an exit port of the oil and air separator,
   wherein the source of combustion engine crankcase gases is an engine oil fill port;
   wherein combustion engine crankcase gases may flow through the connector, valve, separator, and breather filter to the atmosphere; and
   wherein the oil and air separator removes a portion of oil entrained in the combustion engine crankcase gases exiting the combustion engine crankcase.

9. The breather system of claim 8, wherein the oil and air separator includes:
   a can including a first chamber fluidly coupled to the separator inlet and a second chamber fluidly coupled to the separator exit port; and
   a barrier separating the first chamber and the second chamber.

10. The breather system of claim 9, wherein the barrier includes a coalescing filter material.

11. The breather system of claim 10, wherein the coalescing filter material includes steel wool.

* * * * *